United States Patent [19]

Ten Broeck

[11] 4,098,858
[45] Jul. 4, 1978

[54] DUSTLESS FREE FLOWING RUBBER ADDITIVES

[75] Inventor: Theodore R. Ten Broeck, Hudson, Ohio

[73] Assignee: The Goodyear Tire & Rubber Company, Akron, Ohio

[21] Appl. No.: 761,559

[22] Filed: Jan. 24, 1977

Related U.S. Application Data

[63] Continuation of Ser. No. 578,684, May 19, 1975, abandoned, which is a continuation-in-part of Ser. No. 430,380, Jan. 2, 1974, abandoned.

[51] Int. Cl.$^2$ ................................................ B01J 2/16
[52] U.S. Cl. .................................... 264/117; 264/118; 264/DIG. 51
[58] Field of Search ............... 264/117, 118, DIG. 51, 264/6, 7

[56] References Cited

U.S. PATENT DOCUMENTS

| | | | |
|---|---|---|---|
| 2,768,095 | 10/1956 | Tadema et al. | 264/DIG. 51 |
| 3,265,798 | 8/1966 | Black et al. | 264/117 |
| 3,856,441 | 12/1974 | Suzukawa et al. | 264/117 |
| 3,880,968 | 4/1975 | Kaspar et al. | 264/DIG. 51 |

Primary Examiner—Robert F. White
Assistant Examiner—James R. Hall
Attorney, Agent, or Firm—J. Y. Clowney

[57] ABSTRACT

This invention relates to a process for agglomerating a finely divided material with a rubber latex to form dustless, free-flowing granules in which rubber latex is sprayed onto a dampened finely divided material while the dampened finely divided material is suspended in a gaseous medium.

8 Claims, No Drawings

DUSTLESS FREE FLOWING RUBBER ADDITIVES

This is a continuation of application Ser. No. 578,684, filed 5-19-75 now abandoned which is a continuation of Ser. No. 430,380 filed 1-2-74 now abandoned.

This invention relates to a process of agglomerating normally dusty, finely divided materials with rubber latex or partially prevulcanized rubber latex and thereby improving dispersability of such agglomerates used as compounding ingredients in rubber compositions. More specifically, this invention relates to a method for preparing a mixture of finely divided particles comprising a rubber latex and a finely divided material to obtain the free-flowing agglomerate.

The use of finely divided materials in compounding of both natural and synthetic rubber presents certain problems to the rubber goods manufacturers. The finely divided nature of these materials causes them to be blown into the air during production operations such as milling or other mixing. This results in an increase in the cost of production and in the possible contamination of other materials.

In addition, the nature of some finely divided compounding ingredients makes uniform dispersion in rubber difficult since finely divided materials, particularly powders, tend to form lumps or cakes which may stick or cake on the mill roll or remain undispersed in internal mixers such as Banburys thus increasing the time, effort and expense required to form an intimate dispersion in the rubber. Such lumping and caking makes the use of automatic weighing and mixing equipment unfeasible.

Efforts have been made to reduce the objectionable features of finely divided materials by converting such finely divided materials into agglomerates. The prior art discloses that in order to form such agglomerates, an agglomerating agent must be added to the finely divided material for the agglomerate to remain stable. Frequently this agglomerating agent has been a material which was objectionable when mixed into a rubber compound with which the finely divided material was used. Also, some of the prior art agglomerates were cohesive and thus not free flowing. Such compositions do not lend themselves to either normal handling and weighing procedures or automatic handling and weighing procedures. Some agents previously employed for preparing agglomerates were used in such large amounts that the rubber ingredient was excessively diluted. Such diluted ingredients can form agglomerates which do not disperse readily in rubber during mixing operations or are not sufficiently stable to be transported from the manufacturer to the user.

The prior art teaches that when manufacturing agglomerates from a finely divided material which may be in a damp filter cake form, said finely divided material is reduced to a paste, forced through an extruder into rod or L-shaped form, dried, and then ground or chopped to the desired size. Such products tend to become finely divided again during shipping due to settling that occurs when containers of these materials are handled.

It is an object of this invention to provide a method for converting finely divided materials to an agglomerate of such a nature that individual agglomerates do not break down but remain an agglomerate during normal warehousing and weighing operations, yet disperse uniformly into rubber during mixing operations. Another object of this invention is to make an agglomerate of finely divided material and rubber latex which lends itself to use in automated weighing and mixing equipment. Other objects will become apparent to those skilled in this art as the description proceeds.

The finely divided materials to which this invention relates are materials which are in or susceptible to being made into a finely divided state whereby they may be agglomerated with latices of rubber.

The process of this invention comprises (1) forming a damp mass or cake of finely divided material, said cake having a dry solids content of from about 60 percent to about 95 percent by weight of the total weight of the cake, (2) placing said cake in a gas suspension apparatus which divides and crumbles the cake into small particles while suspending said particles in a gaseous medium and (3) slowly adding to the gaseous suspension an amount of a finely divided spray of a rubber latex having a solids content of from about 9 percent to about 70 percent by weight of total weight of the latex to provide from about 1 to about 30 parts dried rubber for 100 parts of dry finely divided material and (4) mixing the particles of latex and particles of damp cake while both are suspended in said gaseous medium for a time sufficient to allow the particles of latex spray to collide with the small particles of the damp finely divided material and form composite particles or agglomerates comprising rubber and said small particles of damp finely divided material, said composite particles having an average diameter of from about 0.003 inch to about 0.10 inch, and (5) drying said composite particles at a temperature and time sufficient to drive off excess moisture and to provide a dustless, free flowing agglomerate of rubber and normally finely divided material.

For some materials it is necessary to discharge the composite particles into a screening apparatus which free screens out the smaller of the composite particles and then force screens the balance of the composite particles to the desired agglomerate size before drying.

Representative examples of rubber latices useful in the practice of this invention are latices of normally rubbery polymers such as polybutadiene latex, the latices of rubbery polymers of butadiene and styrene, the latices of rubbery copolymers of butadiene and acrylonitrile, the latices of polychloroprenes, the latices of rubbery copolymers of isobutylene and isoprene, and natural rubber latex. The latices of the rubbery copolymers of butadiene and styrene and the latices of rubbery copolymers of butadiene and acrylonitrile are preferred for most finely divided materials.

Generally a sufficient amount of rubber latex is used to provide from about 1 to about 30 parts (dry weight) of rubber per 100 parts of finely divided material. Preferably an amount is used to provide from about 1 to about 10 parts of rubber (dry weight) to 100 parts of dry finely divided material. Some of these finely divided materials require only an amount to provide from about 1 to about 2 parts of rubber (dry weight) to 100 parts of dry finely divided material.

Finely divided materials most easily agglomerated by the process of this invention are those produced and finished in an aqueous medium. Other finely divided material can also be treated using the process described but require that the additive first be moistened with water to the desired level, and thus requires additional handling. Some materials can also be reduced to a finely divided state, dampened, and then agglomerated using the process of this invention in order to improve dispersability in rubber compounds. The damp finely divided material must be high enough in total solids content to crumble easily when placed inside a gas suspension apparatus and low enough in total solids content to remain dustless.

Representative examples of finely divided materials useful in this invention are thiazoles such as 2-mercaptobenzothiazole, 2,2'-dithiobis(benzothiazole), 2-(morpholinodithio)benzothiazole, zinc 2-benzothiazolyl mercaptide and copper 2-benzothiazolyl mercaptide; metal dithiocarbamic acid salts such as zinc dimethyldithiocarbamate, zinc diethyldithiocarbamate, zinc dibutyldithiocarbamate, copper (II) dimethyldithiocarbamate, copper (II) diethyldithiocarbamate, cadmium diethyldithiocarbamate and lead diethyldithiocarbamate; thiuram sulfides such as tetramethylthiuram disulfide, tetramethylthiuram monosulfide, tetraethylthiuram disulfide and mixtures of tetraethylthiuram disulfide and tetramethylthiuram disulfide; sulfenamides such as N-cyclohexyl-2-benzothiazolesulfenamide, N-t-butyl-2-benzothiazolesulfenamide, N-(3-methylcyclopentamethylene)-2-benzothiazolesulfenamide and 2-(N-hexamethyleneiminothio)-benzothiazole; and various rubber compounding ingredients such as morpholine disulfide, blends of 2-mercaptobenzothiazole and tetramethylthiuram disulfide, 4-morpholino-2-benzothiazyl disulfide, asbestos and sulfur, dyes such as minastral blue, phthalo green and pyrrazolone red, and resins such as halogenated phenol/formaldehyde resins sold by Schenectady Chemicals as SP 1055 and unmodified phenol/formaldehyde resins sold as Amberol ST 137 by Rohm & Haas.

Natural rubber latex is normally used to agglomerate only those finely divided materials containing no metals such as copper, iron and manganese which are normally deleterious to natural rubber.

The equipment used for mixing the finely divided latex spray droplets and the damp finely divided material is a kind that will suspend the damp finely divided material in a gaseous medium such as air and in which the latex can be injected into the interior of the apparatus in a finely divided spray at a slow rate and mixed with the damp finely divided material. The time of mixing should be sufficient for the latex spray and the particles of damp finely divided material to collide and form composite particles having an average diameter ranging from about 0.003 inch to about 0.10 inch. The amount of latex used and the time of the actual mixing can be varied.

Free screening can be accomplished by moving the damp free-flowing agglomerate across a vibrating sieve. The sieve used for free screening is usually flat or a rotating drum moving at a slight angle from the horizontal. Various methods of free screening are known in the art and can be used with the materials of this invention.

In force screening the unscreened material is placed on a rotating sieve of the desired screen opening size and forced against a roller rotating in the opposite direction from the sieve's rotation. The roller is adjusted near the surface of the sieve, normally at a distance less than the diameter of the sieve opening to force the particles through the openings of the sieve. The roller used is normally large enough in diameter to contain the rolling unscreened material on one side. Various methods of force screening are known in the art and can be used with the materials of this invention.

The time and temperature of drying can be varied over a wide range. Generally the slightly damp agglomerated particles are tumble dried between 150° F. and 160° F. for a time ranging from about 2 to about 4 hours. Pan drying of the agglomerated particles can be used if desired and can be carried out in an oven for about 30 to about 60 minutes at a temperature of from 150° F. to about 160° F. The time needed is dependent upon the thickness of the damp crumb in the drying pan. Another drying method that can be used is the hot air flotation drying, known as fluid bed drying, where the small agglomerates are placed in an apparatus and warm air in fine streams is blown through the small particles. The warm air suspends the particles and carries away moisture.

A Patterson-Kelly V shell blender or a Littleford-Lodge precision mixer are convenient types of equipment that can be used for suspending the finely divided damp rubber additive in a gaseous medium.

The examples below illustrate the invention and show use of the methods of this invention to produce dustless, free-flowing agglomerated rubber additives comprising rubber and asbestos. The equipment used for Examples 1 through 3 was a Patterson-Kelly liquid-solids twin shell V-shaped blender, which is well known to those skilled in this art.

EXAMPLE 1

A Patterson-Kelly 8-quart internal volume liquid-solids blender was charged to two-thirds of its internal volume with 2870 grams of 80 percent total solids content asbestos flock. The blender was started and while running 460 grams of 25 percent total solids content styrene/butadiene (SBR) latex was metered into the blender chamber and distributed on the asbestos flock. The blender was allowed to run for a short period after latex addition was complete. The batch was discharged into a pan as a damp agglomerate or crumb. The rubber-asbestos flock agglomerate was pan dried in a circulating air oven at 70° C. or 158° F. for a period of about four hours.

EXAMPLE 2

The procedure used was the same as described in Example 1 above except 460 grams of 25 percent total solids content acrylonitrile/butadiene (NBR) latex was used in place of the SBR latex.

EXAMPLE 3

The procedure used was the same as that described in Example 1 above except that the latex used was 460 grams of 25 percent total solids content natural rubber (NR) latex was used in place of the SBR latex.

Table I below shows the particle size obtained using 80 percent total solids content asbestos flock agglomerated with various latices having 25 percent total solids content (TSC) in a Patterson-Kelly liquid-solids blenders as opposed to nonagglomerated asbestos.

Table I

|  | Control (No Latex) | 1 | 2 | 3 |
|---|---|---|---|---|
|  | Parts by Weight, Dry | | | |
| Asbestos Flock | 100 | 100 | 100 | 100 |
| SBR Latex 25% T.S.C. |  | 5 |  |  |
| NBR Latex 25% T.S.C. |  |  | 5 |  |
| NR Latex 25% T.S.C. |  |  |  | 5 |
| Particle Size, % | | | | |
| on 20 mesh | 52.5 | 52.2 | 50.0 | 94.3 |
| Through 20 mesh to 40 mesh | 35.5 | 38.9 | 36.0 | 5.0 |
| Through 40 mesh to 60 mesh | 2.2 | 6.5 | 8.0 | .4 |
| Through 60 mesh to 100 mesh | 9.8 | 2.4 | 6.0 | 0.3 |
| Through 100 mesh | 4.1 | 0.7 | 1.8 | 0.2 |
| Bulk Density (grams/cubic | | | | |

Table I-continued

|  | Control (No Latex) | 1 | 2 | 3 |
|---|---|---|---|---|
|  | Parts by Weight, Dry | | | |
| centimeter) | .32 | .63 | .64 | .64 |

4-Morpholinyl-2-benzothiazyl disulfide was treated with 1.25 parts SBR latex (dry weight) per 100 parts of said disulfide using latex having different total solids content. The materials were agglomerated in a Littleford-Lodige high speed internal mixer having a four cubic foot internal capacity. As the total solids content of the disulfide was increased, a lower total solids content SBR latex was used yielding a more uniform particle size. The data are shown in Examples 4 to 6.

Table II below shows the effect of variation of latex total solids content on the particle size of the finished product and a comparison with the particle size of unagglomerated powder. This data reveals that the water content of the mixing system as a whole is an important factor.

Table II

100 Parts of 82% TSC 4-Morpholinyl 2-Benzothiazyl Disulfide Cake Treated with 1.25 parts/100 SBR Latex Containing Different TSC of Rubber

|  | 4 Latex 13.7% TSC | 5 Latex 25% TSC | 6 Latex 45% TSC | Control 82% 4-Morpholinyl 2-Benzothiazyl Disulfide Cake (no latex) |
|---|---|---|---|---|
| On 20 mesh screen | 61.9% | 31.6% | 15% | 4.3% |
| Through 20 on 40 mesh | 23.9% | 37.4% | 28.4% | 5.6% |
| Through 40 on 100 mesh | 13.1% | 30.6 | 56.2 | 14.1% |
| Through 100 mesh on 200 | 1.1 | 0.4 | 0.4 | 29.1 |
| Through 200 mesh |  |  |  | 46.9 |

In carrying out the process of total solids content of the latex is adjusted according to the solids content of the damp finely divided material being agglomerated. When the finely divided material is low in total solids content (from 60 to 70%) a higher total solids content latex is used. The preferred latex total solids contents is from 25 to 45 percent. When the total solids content of the finely divided material and the total solids content of the rubber latex combined produce a total solids content for the entire system in the range of from 60 to 95 percent total solids content, the particle size of the agglomerate produced is small enough to eliminate both free screening and force screening with some materials. It was found that at least 1.25 parts of SBR per 100 parts of finely divided material was required to obtain good properties of dustlessness and flowability.

In Examples 4 to 6, 4-morpholinyl 2-benzothiazyl disulfide was free screened as it came from the mixer. Twelve, ten and six mesh screens were used, producing a more uniform particle size in the treated material. A portion of the wet latex coated 4-morpholinyl 2-benzothiazyl disulfide could not be free screened through twelve mesh. This portion was force screened through 12 mesh screen. When high total solids content latex was used, the amount of material needing to be force screened was low. For example, using 45 percent total solids content latex, 12 percent of the batch was force screened through 12 mesh screen. At 25 percent total solids content latex, 20 percent of the batch was force screened through 12 mesh screen and with a 13 percent total solids content latex, 67 percent of the batch was force screened through 12 mesh screen. In contrast, free screening untreated material through a 12 mesh screen left 10 percent to be force screened. While the examples described herein illustrate the invention with respect to a single finely divided material, two or more such finely divided materials can be combined or added together and a mixed agglomerated formed.

The agglomerates prepared according to Examples 1 through 6 are stable, nondusting and free flowing. When these free flowing agglomerates were mixed with rubber in accordance with normal practices in a Banbury internal mixer or on a mill, the agglomerates dispersed rapidly and uniformly.

While certain representative embodiments and details have been shown for the purpose of illustrating this invention, it will be apparent to those skilled in this art that various changes and modifications may be made herein without departing from the spirit or the scope of the invention.

I claim:

1. A process for forming dustless free flowing agglomerates consisting essentially of (1) forming a damp mass or cake of at least one finely divided material selected from the group consisting of 2-mercaptobenzothiazole, 2,2'-dithiobis(benzothiazole), 2-morpholinodithio)benzothiazole, zinc 2-benzothiazolyl mercaptide, copper 2-benzothiazolyl mercaptide, zinc dimethyldithiocarbamate, zinc diethyldithiocarbamate, zinc dibutyldithiocarbamate, zinc diethyldithiocarbamate, zinc dibutyldithiocarbamate, copper (II) dimethyldithiocarbamate, copper (II) diethyldithiocarbamate, cadmium diethyldithiocarbamate, lead diethyldithiocarbamate, tetramethylthiuram disulfide, tetramethylthiuram monosulfide, tetraethylthiuram disulfide, mixtures of tetraethylthiuram disulfide, tetramethylthiuram disulfide, N-cyclohexyl-2-benzothiazolesulfenamide, N-t-butyl-2-benzothiazolesulfenamide, N-(3-methylcyclopentamethylene)-2-benzothiazolesulfenamide, 2-(N-hexamethyleneiminothio)-benzothiazole, morpholine disulfide, blends of 2-mercaptobenzothiazole, tetramethylthiuram disulfide, 4-morpholino-2-benzothiazyl disulfide, asbestos, sulfur, minastral, blue, phthalo green and pyrrazolone red, said damp mass or cake of finely divided material having a dry solids content of from about 60 to about 95 percent by weight of said finely divided material, (2) placing said damp mass or cake in a gas suspension apparatus which divides and crumbles the damp mass or cake into small particles while suspending said particles in a gaseous medium and (3) slowly adding to the gaseous suspension an amount of a finely divided spray of a rubber latex having a solids content of from about 9 percent to about 70 percent by weight of total weight of the latex to provide from about 1 to about 30 parts dried rubber for 100 parts of dry finely divided material and (4) mixing the particles of latex and particles of damp mass or cake while both are suspended in said gaseous medium for a time sufficient to allow the particles of latex spray to collide with the small particles of the damp finely divided material and form composite particles or agglomerates comprising rubber and said small particles of damp finely divided material, said composite particles having an average diameter of from about 0.003 inch to about 0.10 inch, and (5) drying said composite particles at a temperature and time sufficient to drive off excess moisture and to provide a dustless, free flowing agglomerate of rubber and normally finely divided material.

2. A process according to claim 1 wherein the finely divided material is asbestos.

3. A process according to claim 1 wherein the rubber latex is selected from the group consisting of the latices of rubbery copolymers of butadiene and styrene, the latices of rubbery copolymers of butadiene and acrylonitrile, the latices of polychloroprenes, the latices of rubbery copolymers of isobutylene and isoprene and natural rubber latex.

4. A process according to claim 3 in which the rubber latex is selected from the group consisting of latices of rubbery copolymers of butadiene and styrene and the latices of rubbery copolymers of butadiene and acrylonitrile.

5. A process according to claim 3 wherein the finely divided material is 2-(morpholinodithio)benzothiazole, the rubber latex is a latex of rubbery copolymers of butadiene and styrene having a total solids content from about 10 to about 50 percent, and the agglomerates formed have a total dry rubber content from 1.00 to 10.00 parts by weight per hundred parts of dry 2-(morpholinodithio)benzothiazole.

6. A process according to claim 1 wherein the finely divided material is 4-morpholinyl-2-benzothiazyl disulfide, the rubber latex is a latex of rubbery copolymers of butadiene and styrene having a total solids content of from 25 to 45 percent, and the agglomerates formed have a total dry rubber content of from 1.00 to 2.00 parts per hundred parts of dry 4-morpholine-2-benzothiazyl disulfide.

7. A process according to claim 1 wherein the finely divided material is asbestos, the rubber latex is a copolymer of butadiene and acrylonitrile having a total solids content of from 10 to 30 percent, and the agglomerate formed has a total dry rubber content of from 1.00 to 10 parts per hundred parts of dry asbestos.

8. A process according to claim 1 wherein the finely divided material is asbestos, the rubber latex is a copolymer of butadiene and styrene having a total solids content of from 25 to 45 percent, and the agglomerate formed has a total dry rubber content of from 1.00 to 10 parts per hundred parts of dry asbestos.

* * * * *